(12) United States Patent
Erler et al.

(10) Patent No.: US 11,500,935 B2
(45) Date of Patent: Nov. 15, 2022

(54) INDEX FOR TRAVERSING HIERARCHICAL DATA

(71) Applicant: SAP SE, Walldorf (DE)

(72) Inventors: Bastian Erler, Walldorf (DE); Gerald Franz, Walldorf (DE); Hannes Jakschitsch, Walldorf (DE); Roland Sedler, Leimen (DE)

(73) Assignee: SAP SE, Walldorf (DE)

( * ) Notice: Subject to any disclaimer, the term of this patent is extended or adjusted under 35 U.S.C. 154(b) by 863 days.

(21) Appl. No.: 16/246,171

(22) Filed: Jan. 11, 2019

(65) Prior Publication Data

US 2019/0317963 A1 Oct. 17, 2019

Related U.S. Application Data

(60) Provisional application No. 62/656,137, filed on Apr. 11, 2018.

(51) Int. Cl.
*G06F 16/00* (2019.01)
*G06F 16/901* (2019.01)

(52) U.S. Cl.
CPC ........ *G06F 16/9027* (2019.01); *G06F 16/902* (2019.01); *G06F 16/9024* (2019.01)

(58) Field of Classification Search
CPC . G06F 16/902; G06F 16/9024; G06F 16/9027
See application file for complete search history.

(56) References Cited

U.S. PATENT DOCUMENTS

| | | | | |
|---|---|---|---|---|
| 2011/0307507 A1* | 12/2011 | Zhou | .......................... | G06F 8/74 707/769 |
| 2013/0246438 A1* | 9/2013 | Gestrelius | ........... | G06F 16/2237 707/745 |
| 2014/0280356 A1* | 9/2014 | Danilak | ................ | G06F 3/0619 707/796 |
| 2016/0232207 A1* | 8/2016 | Brunel | .............. | G06F 16/24553 |

* cited by examiner

*Primary Examiner* — Dinku W Gebresenbet
(74) *Attorney, Agent, or Firm* — Mintz Levin Cohn Ferris Glovsky and Popeo, P.C.

(57) ABSTRACT

A method for traversing hierarchical data is provided. The method may include generating, based on a source table stored in a database, an index for traversing a graph corresponding to the source table. The source table may identify a parent node for each node in the graph. The generating of the index may include iterating over the source table to generate an inner node map. The inner node map may include at least one mapping identifying one or more children nodes descending from an inner node in the graph. The graph may be traversed based at least on the index. The index may enable the graph to be traversed depth first starting from a root node of the graph and continuing to a first child node descending from the root node of the graph. Related systems and articles of manufacture, including computer program products, are also provided.

19 Claims, 8 Drawing Sheets

FIG. 1

| ROW NUMBER | PARENT ID | NODE ID |
|---|---|---|
| 0 | C₁ | B₁ |
| 1 | R₁ | B₁ |
| 2 | R₁ | B₂ |
| 3 | B₁ | C₁ |
| 4 | B₂ | C₂ |
| 5 | B₂ | C₃ |
| 6 | R₁ | C₃ |
| 7 | C₁ | D₁ |
| 8 | C₃ | D₂ |
| 9 | NULL | R₁ |

INDEX FOR TRAVERSING HIERARCHICAL DATA

CROSS REFERENCE TO RELATED APPLICATION

This application claims priority to U.S. Provisional Application No. 62/656,137 filed on Apr. 11, 2018 and entitled "INDEX FOR TRAVERSING HIERARCHICAL DATA," the disclosure of which is incorporated herein by reference in its entirety.

TECHNICAL FIELD

The subject matter described herein relates generally to database processing and more specifically to traversing hierarchical data.

BACKGROUND

A database may be configured to store data in accordance with a database schema. For example, the database may store hierarchical data in the form of a graph such as, for example, a tree, a forest, and/or the like. As such, the data stored in the database may be represented using graph structures including, for example, nodes, edges, and/or the like. The relationships between different data items may be stored explicitly in the database. For instance, the nodes in the graph may correspond to individual data items while the edges in the graph may define the relationships between the data items. The relationships between the data items may be hierarchical, as represented by the directionality of the edges interconnecting the nodes in the graph. Accordingly, each node in the graph may be a parent node, a child node, and/or a sibling node to one or more other nodes in the graph. Furthermore, the nodes and/or the edges in the graph may be associated with attributes providing additional properties for the corresponding data items and/or the relationships that exist between different data items.

SUMMARY

Systems, methods, and articles of manufacture, including computer program products, are provided for traversing hierarchical data. In one aspect, there is provided a system including at least one data processor and at least one memory. The at least one memory may store instructions that cause operations when executed by the at least one data processor. The operations may include: generating, based at least on a source table stored in a database, an index for traversing a graph corresponding to the source table, the source table identifying a parent node for each node in the graph, the generating of the index including iterating over at least a portion of the source table to generate an inner node map, and the inner node map including at least one mapping identifying one or more children nodes descending from an inner node in the graph; and traversing, based at least on the index, the graph, the index enabling the graph to be traversed depth first starting from a root node of the graph and continuing to a first child node descending from the root node of the graph.

In some variations, one or more features disclosed herein including the following features can optionally be included in any feasible combination. The inner node map may be generated by at least adding, to the inner node map, the at least one mapping in response to determining that the inner node occupies a first row in the source table. The at least one mapping may associate the inner node with the first row in the source table. The first row may be occupied by the inner node and a first child node of the inner node. At least one mapping may be updated in response to determining that the inner node occupies a second row in the source table. The at least one mapping may be updated to associate the inner node with the second row in the source table. The second row may be occupied by the inner node and a next child node of the inner node.

In some variations, the generating of the index may further include iterating over at least the portion of the source table to generate a next sibling vector. The next sibling vector may indicate a next sibling node for at least one node in the graph. The next sibling node for the at least one node may be a sibling node occupying a higher row in the source table than the at least one node.

In some variations, in response to the updating of the at least one mapping, the next sibling vector may be updated to at least identify the next child node of the inner node as being a next sibling node for a child node of the inner node that is last encountered during the iteration over at least the portion of the source table.

In some variations, the generating of the index may further include iterating over at least the portion of the source table to generate a root node list. A node may be added to the root node list based at least on the node not being associated with a parent node in the source table. The root node list may enable an identification of the root node from which to start traversing the graph.

In some variations, a unique node identifier may be assigned to the inner node. The generating of the index may further include generating a node identifier vector. The node identifier vector may be updated to include the unique node identifier assigned to the inner node. The node identifier vector may further include a default node identifier associated with a leaf node in the graph. The leaf node may be a node without any outgoing edges. The unique node identifier and/or the default node identifier may enable a differentiation between the inner node of the graph and the leaf node of the graph.

In some variations, the traversing of the graph may include popping, onto a stack, the root node followed by the first child node of the root node. A first flag associated with the root node may be set to indicate the root node as having being traversed along a current path through the graph. The current path may start and terminate at the root node. A second flag associated with the first child node may be set based at least on the first child node being an inner node and not a leaf node. The second flag may be set to indicate the first child node as having being traversed along the current path. Whether the first child node and the second child node form a cycle may be determined based at least on a third flag associated with a second child node descending from the first child node. In response to determining that the first child node and the second child node form the cycle, the cycle may be broken by at least avoiding traversing through the second child node. The second child node may be avoided by at least popping, onto the stack, a next sibling node of the first child node instead of the second child node. The root node, the first child node, the second child node, and/or the next sibling node may be determined based at least on the index.

In some variations, the first flag, the second flag, and/or the third flag may be reset in response to the root node being an only node remaining in the stack. The first flag, the second flag, and/or the third flag may be stored as part of the at least one mapping included in the inner node map.

In some variations, the graph may include a plurality of nodes. The graph may further include one or more edges interconnecting the plurality of nodes. A directionality of each of the one or more edges may indicate one or more parent-child relationships amongst the plurality of nodes.

In some variations, the source table may include a first column storing one or more identifiers of parent nodes in the graph. The source table may further include a second column storing one or more identifiers of the corresponding children nodes.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the traversal of hierarchical data, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database storing hierarchical data in the form of a graph may store, for example, a source table that includes mappings between the parent nodes and the children nodes in the graph. The database may further support graph algorithms that require traversing the graph including, for example, shortest path algorithms, risk propagation algorithms, minimum flow algorithms, page rank algorithms, and/or the like. However, traversing the graph may be a protracted operation that consumes an excessive quantity of computational resources. As such, in some example embodiments, a hierarchical data engine may generate, based on a source table, an index for traversing a corresponding graph. The index may enable a depth-first traversal of the graph starting at a root node of the graph. Based on the index, sibling nodes in the graph may be traversed in the order the nodes appear in the source table. Furthermore, the index may enable the detection of cycles within the graph, which may prevent the traversal of the graph from entering an infinite loop.

In some example embodiments, the index may support one or more traversal operations. For example, the index may be used to identify, for each node within the graph, a first child node and/or a next sibling node of the node. Alternatively and/or additionally, the index may be used to determine, for each node within the graph, whether the node is an inner node having at least one outgoing edge. The index may further be used to determine, for each node with in the graph, whether an incoming edge into the node forms a cycle. It should be appreciated that the generation of the index and a lookup into the index, for example, to perform a traversal operation, may be low complexity operations, regardless of the underlying data type (e.g., string, integer, hexadecimal, geometry, and/or the like) of the nodes in the graph. For example, the index may be generated in linear time (e.g., $O(n)$) depending on a size of the source table (e.g., the quantity of rows n) associated with the graph. Meanwhile, regardless of the size of the source table, a lookup into the index may be performed in constant time (e.g., $O(1)$).

Figure 1:
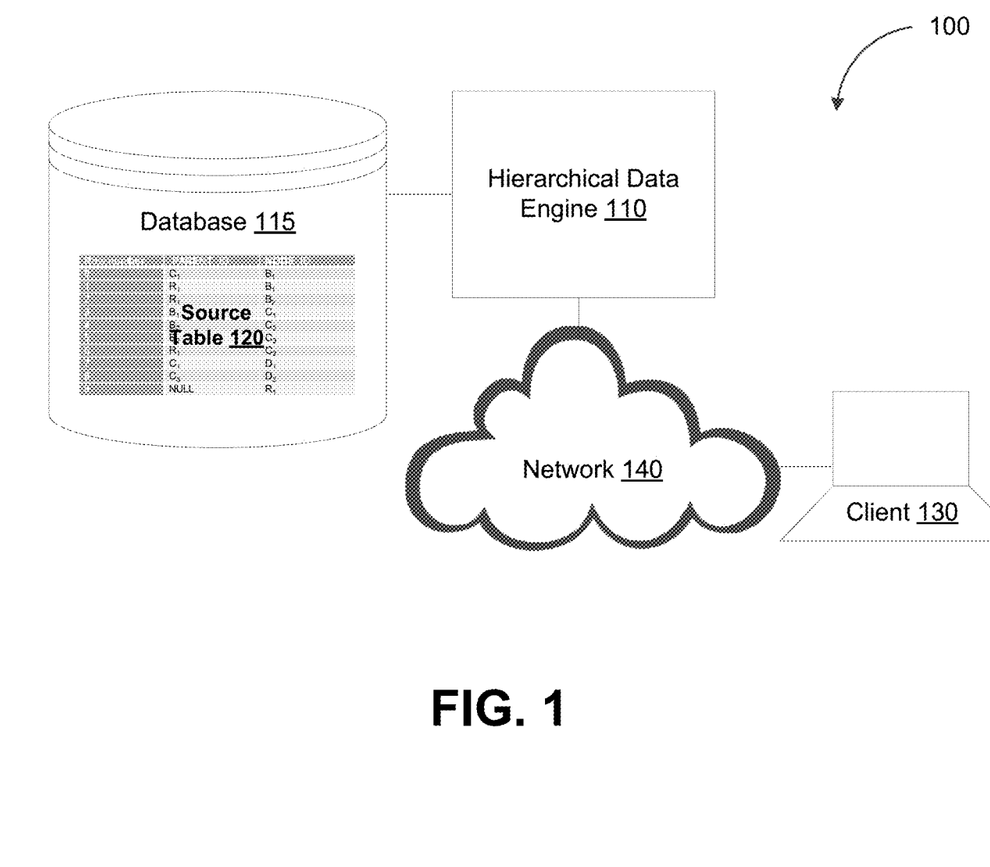
FIG. 1 depicts a system diagram illustrating a data storage system, in accordance with some example embodiments.

FIG. 1 depicts a system diagram illustrating a data storage system 100, in accordance with some example embodiments. Referring to FIG. 1, the data storage system 100 may include a database 115, which may be any type of database including, for example, a relational database, a graph database, a column store, a key-value store, a document store, and/or the like. In some example embodiments, the database 115 may store hierarchical data, for example, in the form of one or more graphs. For example, as shown in FIG. 1, the database 115 may store a source table 120 representative of a graph 200.

Figure 2A:
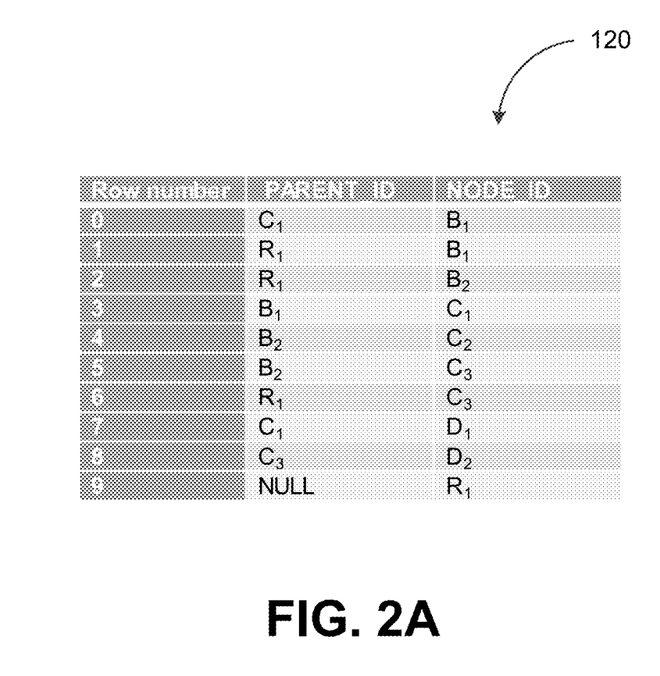
FIG. 2A depicts an example of a source table representative of hierarchical data, in accordance with some example embodiments.
Figure 2B:
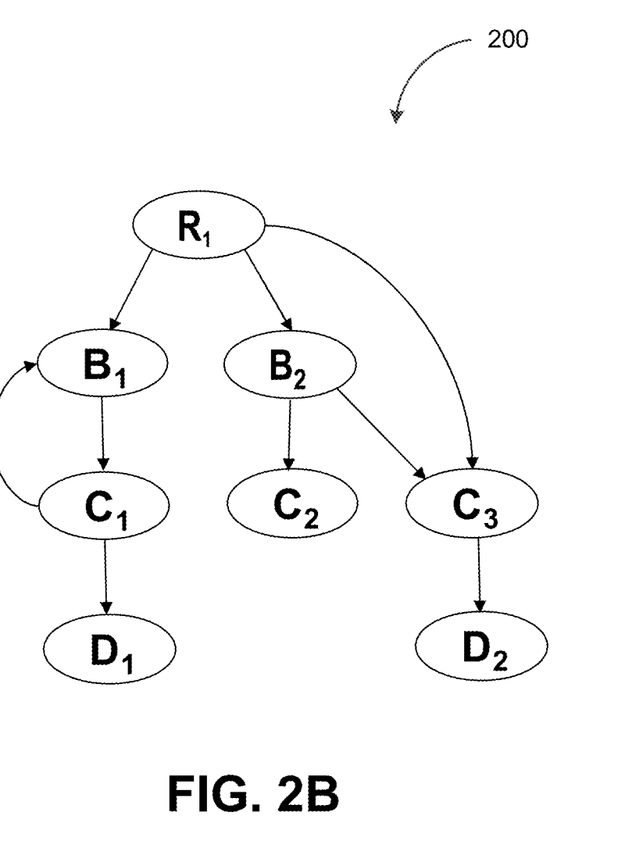
FIG. 2B depicts an example of hierarchical data, in accordance with some example embodiments.

To further illustrate, FIG. 2A depicts the source table 120 while FIG. 2B depicts the graph 200 corresponding to the source table 120. The graph 200 may be an example of hierarchical data. As shown in FIG. 2B, the graph 200 may include a plurality of nodes (e.g., $R_1$, $B_1$, $B_2$, $C_2$, $C_3$, $D_2$ and/or the like) interconnected by one or more edges. The directionality of the edges in the graph 200 may represent the relationship between the nodes in the graph 200. For example, each node in the graph 200 may be a parent node, a child node, and/or a sibling node to one or more other nodes in the graph 200. Referring to FIG. 2A, the source table 120 may store mappings between the parent nodes and the children nodes of the graph 200.

As shown in FIG. 2A, the source table 200 may include a first column (e.g., a PARENT_ID column) storing the identifiers of the parent nodes in the graph 200 and a second column (e.g., a NODE_ID column) storing the identifiers of the corresponding children nodes in the graph 200. Accordingly, each row in the source table 120 may include the identifier of a parent node and the identifier of a child node descending from that parent node. For example, row 0 of the source table 120 may include the node $C_1$ and the node $B_1$, thereby indicating that the node $C_1$ may be a parent node to the node $B_1$ and that the node $B_1$ may be a child node to the node $C_1$. This parent-child relationship may be represented in the graph 200 by an outgoing edge originating at the node $C_1$ and terminating at the node $B_1$. Alternatively and/or additionally, according to row 1 of the source table 120, the node $R_1$ may be also be a parent node to the node $B_1$ while the node $B_1$ may also be a child node to the node $R_1$. The parent-child relationship between the node $R_1$ and the node $B_1$ may be represented in the graph 200 by an outgoing edge originating at the node $R_1$ and terminating at the node $B_1$.

Referring again to FIG. 2B, some of the nodes in the graph 200 may not descend from any parent nodes. For instance, one or more root nodes of the graph 200 may lack incoming edges and therefore may not descend from another node in the graph 200. To represent such nodes, the first column (e.g., the PARENT_ID column) of the source table 120 may include a NULL value. The presence of the NULL value in the first column (e.g., the PARENT_ID column) of the source table 120 may indicate that the node identified in the second column (e.g., the NODE_ID column) of the source table 120 is a root node of the graph 200. For instance, as shown in FIG. 2B, the node $R_1$ may not have any incoming edges. As such, the node $R_1$ may not be child node descending from another node in the graph 2B. Accordingly, the source table 120 may show the parent identifier of the node $R_1$ as being NULL, thereby indicating that the node $R_1$ is a root node of the graph 200.

In some example embodiments, the database 115 may be coupled with a hierarchical data engine 110 configured to respond to requests from one or more clients including, for example, a client 130. For example, as shown in FIG. 1, the client 130 may communicate with the hierarchical data engine 110 via a network 140, which may be any wired and/or wireless network including, for example, a public land mobile network (PLMN), a wide area network (WAN), a local area network (LAN), a virtual local area network (VLAN), the Internet, and/or the like. The client 130 may send, to the database management system 110, a request to execute a graph algorithm including, for example, a shortest path algorithm, a risk propagation algorithm, a minimum flow algorithm, a page rank algorithm, and/or the like. Executing the graph algorithm may require traversing at least a portion of the hierarchical data stored at the database 115 including, for example, the graph 200 corresponding to the source table 120. It should be appreciated that the graph algorithm may be a predefined graph algorithm stored at the hierarchical data engine 110 and/or a custom graph algorithm defined by the client 130.

In order to enable a traversal of the graph 200 corresponding to the source table 120, the hierarchical data engine 110 may generate an index. The index may enable a depth-first traversal of the graph 200 starting at a root node (e.g., the node $R_1$) of the graph. Furthermore, the graph 200 may be traversed based on the index such that sibling nodes in the graph 200 may be traversed in the order the nodes appear in the source table. For example, based on the index, the node $B_1$ may be traversed before its sibling node $B_2$ since the node $B_1$ appears before the node $B_2$ in the source table 120. The index may also enable the detection of cycles within the graph 200 such as, for example, the cycle formed by the nodes $B_1$ and $C_1$. As noted, detecting cycles within the graph 200 prevent the traversal of the graph 200 from entering an infinite loop.

In some example embodiments, the index may include a plurality of data structures including, for example, an inner node map 300, a root node list 310, a next sibling vector 320, and a node identifier vector 330. The hierarchical data engine 110 may generate, based at least on the source table 120, the inner node map 300, the root node list 310, the next sibling vector 320 and/or the node identifier vector 330. Furthermore, the hierarchical data engine 110 may use the inner node map 300, the root node list 310, the next sibling vector 320 and/or the node identifier vector 330 when traversing the graph 200. As noted, the graph 200 may be traversed in order to execute a graph algorithm such as, for example, a shortest path algorithm, a risk propagation algorithm, a minimum flow algorithm, a page rank algorithm, and/or the like.

In some example embodiments, the inner node map 300 may enumerate nodes in the graph 200 that have outgoing edges including, for example, the nodes $R_1$, $B_1$, $B_2$, $C_1$, and $C_3$. Meanwhile, the nodes $C_1$, $D_1$, and $D_2$ may lack outgoing edges and may therefore be the leaf nodes of the graph 200, which may be excluded from the inner node map 300. The root node list 310 may enumerate the root nodes of the graph 200 including, for example, the node $R_1$. As noted, the root nodes of the graph 200 may not have any incoming edges and therefore do not descend from any parent nodes. Alternatively and/or additionally, the next sibling vector 320 may enumerate, for each node in the source table 120, a next sibling node that descends from a same parent node as the node. For example, the nodes $B_1$ and $D_1$ may be sibling nodes descending from the parent node $C_1$. The node $D_1$ may be a next sibling node for the node $B_1$ because the node $D_1$ succeeds the node $B_1$ in the source table 120, for example, by occupying a later row (e.g., row 7) than the node $B_1$ (e.g., row 0).

In some example embodiments, the hierarchical data engine 110 may assign, to each node in the graph 200, a node identifier. The node identifier vector 320 may enumerate the node identifiers assigned to each node in the graph 200. For example, the hierarchical data engine 110 may assign a unique node identifier to each inner node in the graph 200 including, for example, the nodes $R_1$, $B_1$, $B_2$, $C_1$, and $C_3$ included in the inner node map 300. Alternatively and/or additionally, the hierarchical data engine 110 may assign a default node identifier (e.g., a NULL value) to each leaf node in the graph 200 including, for example, the nodes $C_1$, $D_1$, and $D_2$. The node identifier associated with a node may be used to determine whether the node is an inner node or a leaf node. For instance, the node may be identified as an inner node or a leaf node based at least on whether the node is associated with a default node identifier (e.g., a NULL value).

To generate the index, the hierarchical data engine 110 may initialize one or more empty data structures including, for example, an empty inner node map 300 and/or an empty root node list 310. Alternatively and/or additionally, the hierarchical data engine 110 may initialize one or more data structures containing default values (e.g., NULL values). For example, the hierarchical data engine 110 may initialize the next sibling vector 320 and/or the node identifier vector 330 to include one or more default values (e.g., NULL values). Furthermore, the hierarchical data engine 110 may iterate over at least a portion of the source table 120 in order to populate and/or update each of the inner node map 300, the root node list 310, the next sibling vector 320, and/or the node identifier vector 330. As noted, the inner node map 300, the root node list 310, the next sibling vector 320, and/or the node identifier vector 330 may subsequently be used to traverse the graph 200.

In some example embodiments, in order to populate the inner node map 300, the hierarchical data engine 110 may iterate over the first column of the source table 120 (e.g., the PARENT_ID column). As noted, the first column of the source table 120 (e.g., the PARENT_ID column) may store the identifiers of parent nodes in the graph 200 while the second column of the source table 120 (e.g., the NODE_ID column) may store the identifiers of the corresponding children nodes. Meanwhile, the inner node map 300 may hold a plurality of mappings $N_P \rightarrow \{R_f, R_l\}$, each of which mapping a parent node $N_P$ in the source table 120 to a first row $R_f$ and a last row $R_l$ in the source table 120 in which the parent node $N_P$ appears in the first column (e.g., the PARENT_ID column) of the source table 120. Accordingly, to populate the inner node map 300, the hierarchical data engine 110 may iterate over the first column (e.g., the PARENT_ID column) of the source table 120 and add, to the inner node map 300, the mapping $N_P \rightarrow \{R_f, R_l\}$ upon the first occurrence of the parent node $N_P$ in the first column (e.g., the PARENT_ID column) of the source table 120. When the mapping $N_P \rightarrow \{R_f, R_l\}$ is first added to the inner node map 300, the first row $R_f$ and the last row $R_l$ may be associated with a same value. However, as the hierarchical data engine 110 continues to iterate over the first column (e.g., the PARENT_ID column) of the source table 120, the hierarchical data engine 110 may update the value associated with the last row $R_l$ for each successive occurrence of the parent node $N_P$.

Figure 3A:
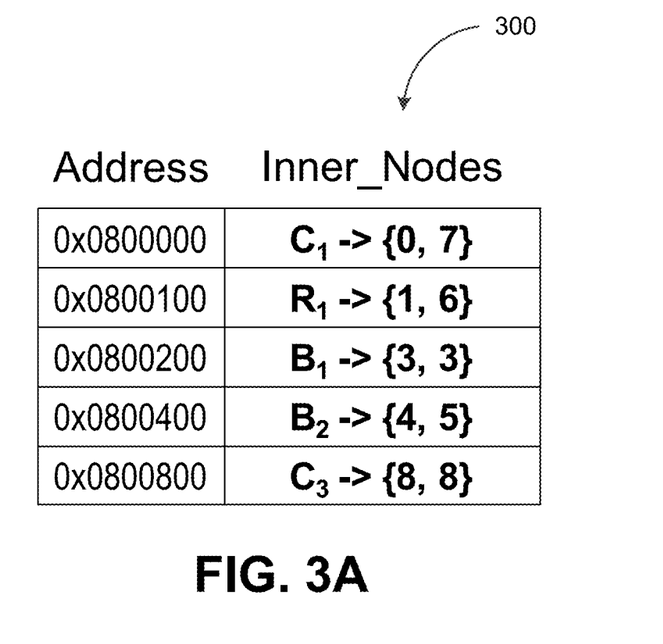
FIG. 3A depicts an example of an inner node map, in accordance with some example embodiments.

To further illustrate, FIG. 3A depicts an example of the inner node map 300, in accordance with some example embodiments. The example of the inner node map 300 shown in FIG. 3A may be fully populated by the hierarchical data engine 110 following an iteration over first column (e.g., the PARENT_ID column) of the source table 120. For instance, as the hierarchical data engine 110 iterates over the first column (e.g., the PARENT_ID column) of the source table 120, the hierarchical data engine 110 may add, to the inner node map 300, the mapping $C_1 \rightarrow \{0,0\}$ when the hierarchical data engine 110 first encounters the node $C_1$ while iterating over the first column (e.g., the PARENT_ID column) of the source table 120. The hierarchical data engine 110 may also add, to the inner node map 300, the mapping $R_1 \rightarrow \{1,1\}$ when the hierarchical data engine 110 first encounters the node $R_1$ while iterating over the first column (e.g., the PARENT_ID column) of the source table 120. In some example embodiments, the hierarchical data engine 110 may update the mapping $C_1 \rightarrow \{0,0\}$ and/or the mapping $R_1 \rightarrow \{1,1\}$ as the hierarchical data engine 110 continues to iterate over the first column (e.g., the PARENT_ID column) of the source table 120. For example, the mapping $C_1 \rightarrow \{0,0\}$ may be updated to $C_1 \rightarrow \{0,7\}$ when the hierarchical data engine 110 next encounters the node $C_1$ in row 7 of the source table 120. Alternatively and/or additionally, the mapping $R_1 \rightarrow \{1,1\}$ may subsequently be updated to $R_1 \rightarrow \{1,2\}$ when the hierarchical data engine 110 encounters the node $R_1$ in row 2 of the source table 120 and again to $R_1 \rightarrow \{1,6\}$ when the hierarchical data engine 110 encounters the node $R_1$ in row 6 of the source table 120.

In some example embodiments, the hierarchical data engine 110 may further populate the root node list 310 by at least iterating over the source table 120. As noted, the presence of the NULL value in the first column (e.g., the PARENT_ID column) of the source table 120 may indicate that the node identified in the second column (e.g., the NODE_ID column) of the source table 120 is a root node of the graph 200. Accordingly, the hierarchical data engine 110 may add, to the root node list 310, the row number of the row occupied by a root node of the graph 200 whenever the hierarchical data engine 110 encounters a NULL value in the first column (e.g., the PARENT_ID column) of the source table 120.

Figure 3B:
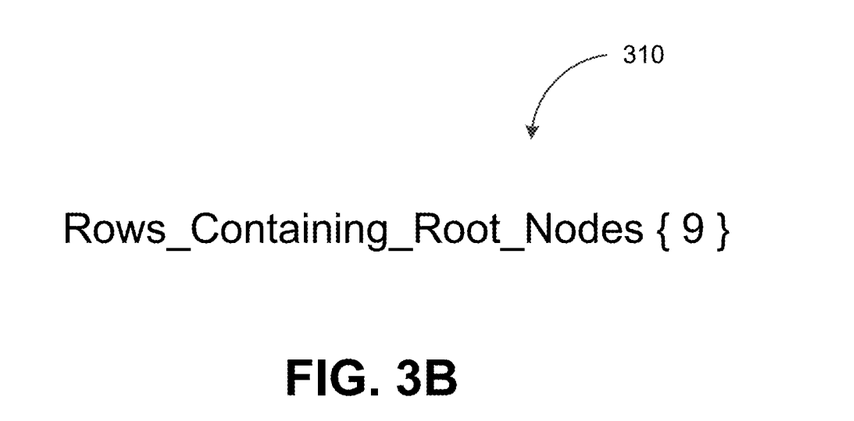
FIG. 3B depicts an example of a root node list, in accordance with some example embodiments.

To further illustrate, FIG. 3B depicts an example of the root node list 310, in accordance with some example embodiments. As shown in FIG. 3B, the root node list 310 may include the row number 9, indicating that the node $R_1$ occupying row 9 is a root node of the graph 200. It should be appreciated that the hierarchical data engine 110 may add, to the root node list 310, the row number 9 when the hierarchical data engine 110 encounters a NULL value in row 9 of the first column (e.g., the PARENT_ID column) of the source table 120.

Figure 3C:
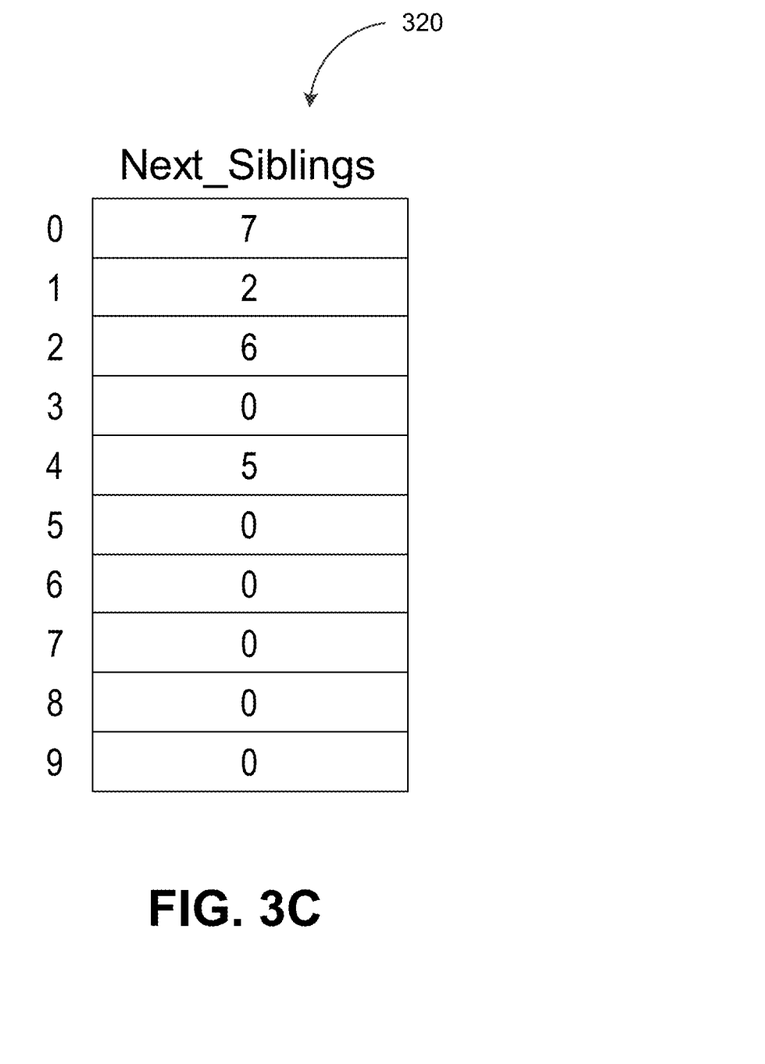
FIG. 3C depicts an example of a next sibling vector, in accordance with some example embodiments.

In some example embodiments, the hierarchical data engine 110 may also update the next sibling vector 320 while iterating over the source table 120. As noted, two or more nodes may be sibling nodes if the two or more nodes descend from a same parent node. Meanwhile, the next sibling node of a node may be a sibling node that succeeds the node in the source table 120, for example, by occupying a later row in the source table. By enumerating the next sibling node of each node in the graph 200, the next sibling vector 320 may be used to ensure that sibling nodes in the graph 200 are traversed in the order the nodes appear in the source table 120.

In some example embodiments, the hierarchical data engine 110 may determine that one node is the next sibling node of another node whenever the hierarchical data engine 110 updates the value of the last row $R_l$ in the mapping $N_P \rightarrow \{R_f, R_l\}$ included in the inner node map 300. For example, based on the mapping $R_1 \rightarrow \{1,1\}$ being updated to $R_1 \rightarrow \{1,2\}$ during the iteration over the first column (e.g., the PARENT_ID column) of the source table 120, the hierarchical data engine 110 may determine that the nodes $B_1$ and $B_2$ share the same parent node $R_1$. Furthermore, the node $B_2$ may be the next sibling node of the node $B_1$ since the node $B_2$ succeeds the node $B_1$ in the source table 120. Accordingly, upon updating the mapping $R_1 \rightarrow \{1,1\}$ to $R_1 \rightarrow \{1,2\}$, the hierarchical data engine 110 may further update the next sibling vector 320 to indicate that the node $B_2$, which appears in row 2 of the source table 120, is the next sibling node to the node $B_1$ appearing in row 1 of the source table 120.

Similarly, when the mapping $R_1 \rightarrow \{1,2\}$ is updated again to $R_1 \rightarrow \{1,6\}$ as the hierarchical data engine 110 continues to iterate over the first column (e.g., the PARENT_ID column) of the source table 120, the hierarchical data engine 110 may determine that the nodes $B_2$ and $C_3$ also share the same parent node $R_1$ and that the node $C_3$ is the next sibling node of the node $B_2$. Accordingly, upon the mapping $R_1 \rightarrow \{1,2\}$ being updated to $R_1 \rightarrow \{1,6\}$, the hierarchical data engine 110 may further update the next sibling vector 320 to indicate that the node $C_3$, which appears in row 6 of the source table 120, is the next sibling node to the node $B_2$ appearing in row 2 of the source table 120.

Figure 3D:
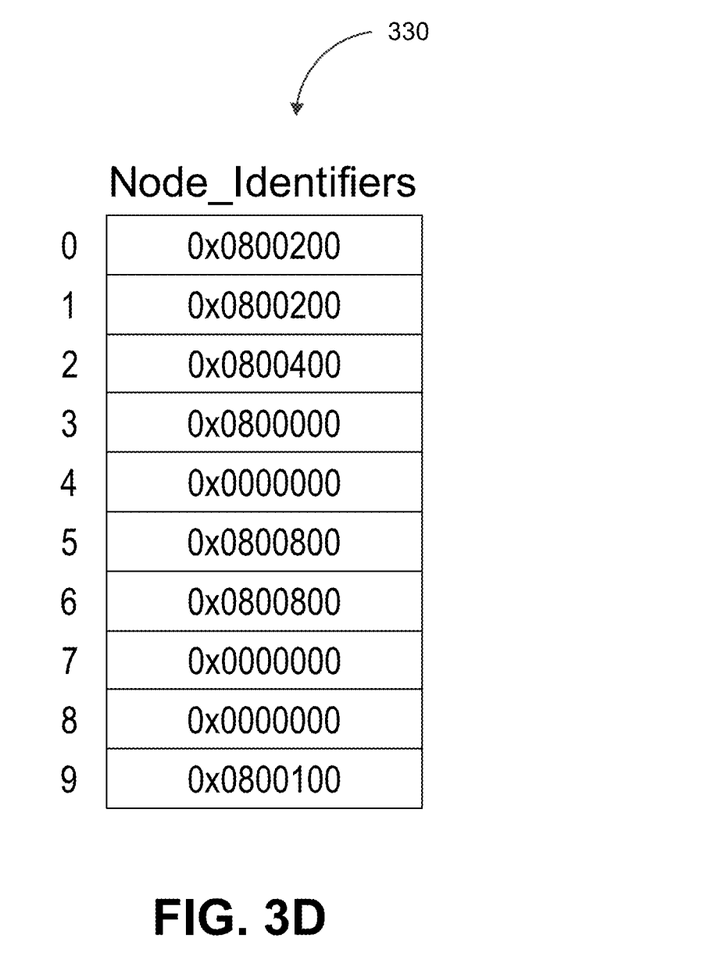
FIG. 3D depicts an example of a node identifier vector, in accordance with some example embodiments.

In some example embodiments, the hierarchical data engine 120 may assign a unique node identifier to each inner node in the graph 200 including, for example, the nodes $R_1$, $B_1$, $B_2$, $C_1$, and $C_3$ enumerated in the inner node map 300. For example, as shown in FIG. 3A, the hierarchical data engine 120 may assign, to each inner node in the graph 200, a pointer such as, for example, a memory address. To populate the node identifier vector 330, the hierarchical data engine 120 may iterate over the second column (e.g., the NODE_ID column) of the source table 120. For each node appearing in the second column (e.g., the NODE_ID column) of the source table 120, the hierarchical data engine 120 may determine, based at least on the inner node map 300, whether that node is an inner node. It should be appreciated that a node may be an inner node if a mapping for the node appears in the inner node map 300. Moreover, for each inner node appearing in the second column (e.g., NODE_ID column) of the source table, the hierarchical data engine 120 may update the node identifier vector 300 by at least adding, to the node identifier vector 300, the node identifier (e.g., pointer) assigned to the inner node. Alternatively and/or additionally, the entries in the node identifier vector 300 that are associated with leaf nodes may be left with a default value.

To further illustrate, FIG. 3D depicts an example of the node identifier vector 330, in accordance with some example embodiments. This example of the node identifier vector 330 may be updated to include the unique node identifiers that have been assigned to each inner node of the graph 200. For example, row 0 of the node identifier vector 330 may include the address 0x0800200 assigned to the node $C_1$, which may be an inner node based on the presence of the mapping $C_1 \rightarrow \{0,7\}$ in the example of the inner node map 300 shown in FIG. 3A. By contrast, row 2 of the node identifier vector 330 may include the address 0x0000000, which may be a default node identifier indicating that the node $B_2$ occupying row 2 of the source table 120 is not an inner node but a leaf node in the graph 200.

In some example embodiments, the hierarchical data engine 110 may update the node identifier vector 330 via multiple parallel processes. For example, the hierarchical data engine 110 may divide the second column (e.g., the NODE_ID column) of the source table 120 into a k quantity of partitions. For each of the k quantity of partitions, the hierarchical data engine 110 may run a separate thread to update, in parallel, the corresponding portions of the node identifier vector 330. For instance, the hierarchical data engine 110 may divide the second column (e.g., the NODE_ID column) of the source table 120 into a first partition and a second partition. The first partition may include row 0 through row 4 of the second column (e.g., the NODE_ID column) of the source table 120 while the second partition may include row 5 through row 9 of the second column (e.g., the NODE_ID column) of the source table. Accordingly, the hierarchical data engine 110 may run one thread to update row 0 through row 4 of the node identifier vector 330 and a separate thread to update row 5 through row 9 of the node identifier 330. In doing so, row 0 through row 4 of the node identifier vector 330 may be updated at a same time as row 5 through row 9 of the node identifier vector 330.

As noted, in some example embodiments, the hierarchical data engine 110 may traverse the graph 200 based an index that includes at least the inner node map 300, the root node list 310, the next sibling vector 320, and/or the node identifier vector 330. For example, the hierarchical data engine 110 may identify, based at least on the root node list 310, the root nodes of the graph 200. The inner node map 300 may be used to identify the first child node of each inner node within the graph 200. For instance, the first child node of an inner node may be a child node of the inner node that appears first in the source table 120. By contrast, a last child node of the inner node may be a child node of the inner node that appears last in the source table 120. Meanwhile, the next sibling vector 320 may be used to identify the next sibling node of each node in the graph 200. Alternatively and/or additionally, the hierarchical data engine 110 may determine, based at least on the node identifier vector 330, whether a node in the graph 200 is an inner node with one or more children nodes and/or a leaf node without any children nodes.

As noted, the hierarchical data engine 110 may rely on the index to perform a depth-first traversal of the graph 200 starting at the root node $R_1$ of the graph 200. The traversal of the graph 200 may include traversing every possible path in the graph 200. As used herein, a single path through a graph may start and terminate at a root node. Sibling nodes in the graph 200 may be traversed in the order the nodes appear in the source table 120. For example, the hierarchical data engine 110 may traverse the node $D_1$ subsequent to the node $B_1$ because the node $D_1$ succeeds the node $B_1$ in the source table 120 and is therefore the next sibling node of the node $B_1$. Furthermore, the hierarchical data engine 110 may rely on the index to detect cycles within the graph 120. For instance, the hierarchical data engine 110 may detect, based on the index, the cycle formed by the nodes $B_1$ and $C_1$. The detection of cycles within the graph 200 may be necessary in order avoid the traversal of the graph 200 from entering an infinite loop.

In some example embodiments, the hierarchical data engine 110 may use a stack in order to traverse the graph 200. Nodes may be popped on and/or off the stack in order to track the progress of the traversal of the graph 200. For example, the hierarchical data engine 110 may pop, onto the stack, a node from the graph 200 when the hierarchical data engine 110 first encounters the node while traversing along a path through the graph 200. The nodes popped onto the stack may be a root node at a start of a path, a first child node of a previous node in the path, and/or a next sibling node of a previous node in the path. However, the hierarchical data engine 110 may not pop, onto the stack, the same node again when the hierarchical data engine 110 encounters the same node a second time along the same path. It should be appreciated that the hierarchical data engine 110 may detect the presence of a cycle within the graph 200 when the same node is encountered multiple times along a same path through the graph 200. Alternatively and/or additionally, the hierarchical data engine 110 may pop a node off the stack upon determining that the node is a leaf node of the graph 200. The hierarchical data engine 110 may also pop a node off the stack once the hierarchical data engine 110 has traversed every child node that descend from that node. The traversal of the graph 200 may be complete once the stack is empty.

As noted, the hierarchical data engine 110 may start traversing the graph 200 from the root node $R_1$ of the graph 200. It should be appreciated that the hierarchical data engine 110 may identify, based at least on the root node list 310, the node $R_1$ as a root node of the graph 200. Accordingly, the hierarchical data engine 110 may pop, onto the stack, the root node $R_1$. The hierarchical data engine 110 may subsequently determine, based at least on the node identifier vector 330, whether the node $R_1$ is an inner node with one or more outgoing edges. For example, the hierarchical data engine 110 may determine that the node $R_1$ is an inner node based at least on the node $R_1$ being associated with a non-default node identifier (e.g., a non-NULL value).

Upon determining that the node $R_1$ is an inner node having one or more outgoing edges, the hierarchical data engine 110 may identify, based at least on the inner node map 300, the first child node of the node $R_1$. For instance, the hierarchical data engine 110 may identify the first child node of the node $R_1$ based on the mapping $R_1 \rightarrow \{1,6\}$. The mapping $R_1 \rightarrow \{1,6\}$ may indicate that the first row in the source table 120 occupied by the node $R_1$ is row 1. Meanwhile, the node in the second column (e.g., the NODE_ID column) of the source table 120 may be the first child node of the node $R_1$. Accordingly, the hierarchical data engine 110 may continue traversing the graph 200 by at least popping, onto the stack, the node $B_1$. The hierarchical data engine 110 may subsequently pop, onto the stack, the node $C_1$, which may be the first child node of the node $B_1$.

As shown in FIG. 2A, the nodes $B_1$ and $C_1$ may form a cycle. To detect the presence of a cycle in the graph 200 such as, for example, the cycle formed by the nodes $B_1$ and $C_1$, the hierarchical data engine 110 may set a flag for every inner node that is visited by the hierarchical data engine 110 while traversing along a path through the graph 200. It should be appreciated that the leaf nodes of the graph 200 may not be associated with a visited flag because the leaf nodes of the graph 200 lack an outgoing edge and are therefore unable to form a cycle. To further illustrate, consider the path from the root node $R_1$ to the node $B_1$ followed by the node $C_1$. As the hierarchical data engine 110 traverses this path through the graph 200, the hierarchical data engine 110 may pop, onto the stack, the nodes $R_1$, $B_1$, and $C_1$. Furthermore, the hierarchical data engine 110 may set the visited flag associated with each of the nodes $R_1$, $B_1$, and $C_1$.

In some example embodiments, the visited flag for an inner node may be stored as part of the corresponding mapping included in the inner node map 300 (e.g., $N_P \rightarrow \{R_f, R_l, \text{flag}\}$). The hierarchical data engine 110 may detect the presence of a cycle in the graph 200 based on the value of the visited flag associated with the nodes encountered by the hierarchical data engine 110 while traversing a path through the graph 200. For example, while after traversing the node $C_1$, the hierarchical data engine 110 may again encounter the node $B_1$ because the node $B_1$ is the first child node of the node $C_1$. However, the hierarchical data engine 110 may detect the cycle formed by the nodes $B_1$ and $C_1$ based at least on the visited flag associated with the node $B_1$, which may already have been set to "true" the first time the hierarchical data engine 110 traversed the node $B_1$. Upon detecting the cycle formed by the nodes $B_1$ and $C_1$, the hierarchical data engine 110 may break the cycle by continuing the traversal of the graph 200 through the other child node (e.g., the node $D_1$) of the node $C_1$ instead of continuing the traversal of the graph 200 through the node $B_1$. Accordingly, the hierarchical data engine 110 may pop, onto the stack, the node $D_1$ instead of the node $B_1$.

In some example embodiments, upon traversing through the node $D_1$, the hierarchical data engine 110 may determine that the node $D_1$ is a leaf node of the graph 200. For example, the hierarchical data engine 110 may determine that the node $D_1$ is a leaf node based at least on the node identifier vector 330, which may indicate that the node $D_1$ is associated with the default node identifier (e.g., a NULL value) associated with leaf nodes that do not have any outgoing edges. Because the node $D_1$ lacks an outgoing edge, the path from the root node $R_1$ may terminate at the node $D_1$. As such, the hierarchical data engine 110 may continue the traversal of the graph 200 by at least popping the node $D_1$ off from the stack, thereby leaving the node $C_1$ at the top of the stack. Upon returning to the node $C_1$, the hierarchical data engine 110 may determine that the hierarchical data engine 110 has already traversed every child node descending from the node $C_1$. For example, the hierarchical data engine 110 may determine that every child node descending from the node $C_1$ have been traversed because, according to the next sibling vector 320, the node $D_1$ lack a next sibling node. Accordingly, the hierarchical data engine 110 may pop the node $C_1$ from the stack. Since the node $C_1$ do not have any sibling nodes as indicated by the next sibling vector 320, the nodes $R_1$ and $B_1$ may remain in the stack subsequent to the removal of the node $C_1$.

Popping the node $C_1$ from the stack may leave the node $B_1$ at the top of the stack. Accordingly, the hierarchical data engine 110 may determine that the hierarchical data engine 110 has traversed every child node descending from the node $B_1$ and therefore pop the node $B_1$ from the stack leaving only the node $R_1$. When an inner node is popped from the stack, the hierarchical data engine 110 may reset visited flag associated with that inner node. At this point, the hierarchical data engine 110 may continue the traversal of the graph 200 by traversing the next sibling node of the node $B_1$ which, according to the next sibling vector 320, may be the node $B_2$. As such, the hierarchical data engine 110 may pop, onto the stack, the node $B_2$. Furthermore, the hierarchical data engine 110 may set the visited flag associated with the node $B_2$ because the node $B_2$ is an inner node, as identified by the inner node map 300. Once the node $B_2$ is popped onto the stack, the hierarchical data engine 110 may continue the traversal of the graph 200 by traversing through a first child node of the node $B_2$. According to the inner node map 300, the first child node of the node $B_2$ may be the node $C_2$, which may appear in row 4 of the source table 120. Based on the node $C_2$ being the first child node of the node $B_2$, the hierarchical data engine 110 may push the node $C_2$ onto the stack.

The hierarchical data engine 110 may not set a visited flag for the node $C_2$ because the node $C_2$, by being associated with a default node identifier (e.g., a NULL value) in the node identifier vector 330, may be a leaf node of the graph 200. As noted, a leaf node cannot form a cycle due to the lack of an outgoing edge. Furthermore, due to the node $C_2$ being a leaf node of the graph 200, the hierarchical data engine 110 may subsequently pop the node $C_2$ from the stack. However, the hierarchical data engine 110 may then push the node $C_3$ onto the stack because the node $C_3$ may be the next sibling node of the node $C_2$ according to the next sibling vector 320. The traversal of the graph 200 may continue through the first child node of the node $C_3$, which may be at the top of the stack at this point. Based on the inner node map 300, the hierarchical data engine 110 may determine that the first child node of the node $C_3$ is the node $D_2$. The node $D_2$ may be popped onto the stack before being popped off due to being a leaf node of the graph 200. The hierarchical data engine 110 may subsequently pop the node $C_3$ from the stack upon determining that the hierarchical data engine 110 have already visited every child node descending from the node $C_3$.

The nodes $R_1$ and $B_2$ may remain in the stack subsequent to the removal of the node $C_3$ from the stack. The hierarchical data engine 110 may subsequently pop the node $B_2$ from the top of the stack upon determining that the hierarchical data engine 110 have visited every child node descending from the node $B_2$. In response to the nodes $C_3$ and $B_2$ being popped from the stack, the hierarchical data engine 100 may reset the visited flags of associated with these inner nodes which, as noted, may be stored as part of the mappings included in the inner node map 300. Furthermore, based on the next sibling vector 320, the hierarchical data engine 110 may determine that the node $C_3$ is the next sibling node of the node $B_2$. As such, the hierarchical data engine 110 may continue the traversal of the graph 200 by at least popping the node $C_3$ back onto the top of the stack. The hierarchical data engine 110 may also set the visited flag associated with the node $C_3$ in order to indicate that the hierarchical data engine 110 has visited the node $C_3$ on this current path. Nevertheless, it should be appreciated that the nodes $R_1$, $B_2$, and $C_3$ do not form a cycle because the node $C_3$ because the node $C_3$ is not visited more than once in this current path.

Upon popping the node $C_3$ onto the stack, the traversal of graph 200 may continue through the node $D_2$, which may be the first child node of the node $C_3$. The hierarchical data engine 110 may pop the node $D_2$ onto the stack before popping the node $D_2$ off the stack upon determining, based at least on the default node identifier (e.g., a NULL value) associated with the node $D_2$ in the node identifier vector 330, that the node $D_2$ is a leaf node of the graph 200. Moreover, because the node $D_2$ lack sibling nodes, the hierarchical data engine 110 may subsequently pop the node $C_3$ off the stack. Finally, the traversal of the graph 200 may return to the root node $R_1$, which may be the only node remaining in the stack subsequent to the removal of the node $C_3$. At this point, the hierarchical data engine 110 may determine that every child node of the root node $R_1$ have been traversed. As such, the hierarchical data engine 110 may pop the root node $R_1$ from the stack, leaving an empty stack indicating the completion of the traversal of the graph 200.

Figure 4:
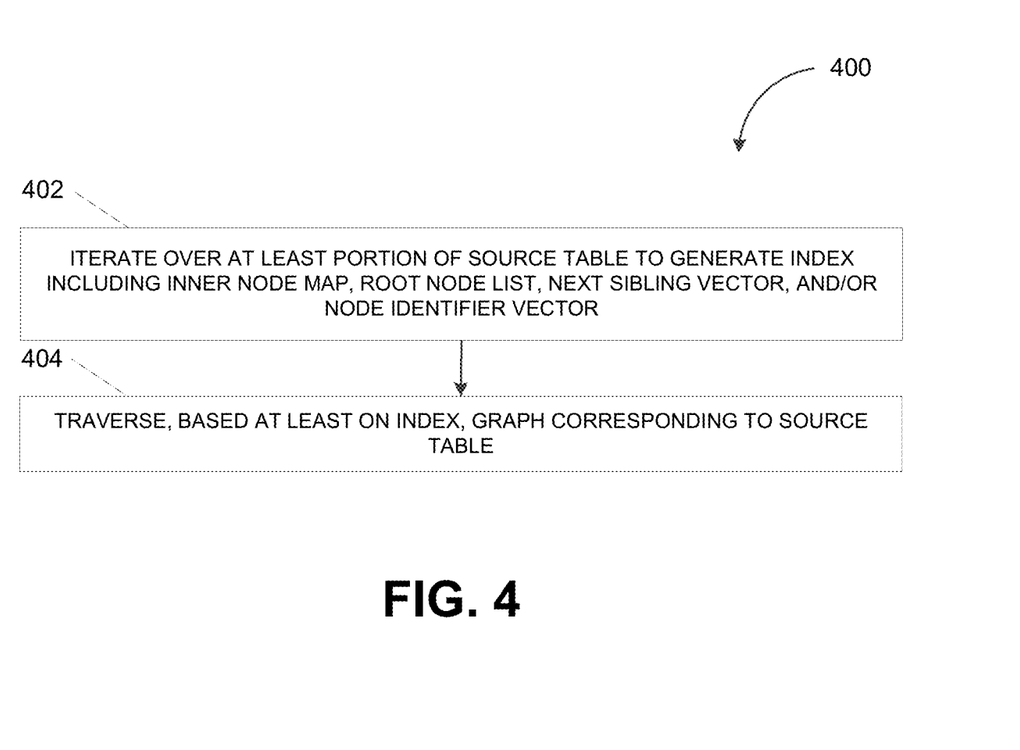
FIG. 4 depicts a flowchart illustrating a process for traversing hierarchical data, in accordance with some example embodiments.

FIG. 4 depicts a block diagram illustrating a process 400 for traversing hierarchical data, in accordance with some example embodiments. Referring to FIGS. 1, 2A-C, 3A-D, and 4, the process 400 may be performed by the hierarchical data engine 110 in order to traverse hierarchical data, for example, in the form of the graph 200.

At 402, the hierarchical data engine 110 may iterate over at least a portion of the source table 120 to at least generate an index including the inner node map 300, the root node list 310, the next sibling vector 320, and/or the node identifier vector 330. In some example embodiments, the source table 120, which may correspond to the graph 200, may store the identifiers of the parent nodes in the graph 200 in the first column (e.g., the PARENT_ID column) of the source table 120. Furthermore, the corresponding identifiers of the children nodes may be stored in the second column (e.g., the NODE_ID column) of the source table 120. As such, each row in the first column (e.g., the PARENT_ID column) of the source table 120 may identify the parent node of the node occupying the same row in the second column (e.g., the NODE_ID column) of the source table. For example, as shown in FIG. 2A, row 0 of the source table 120 may indicate that the node $C_1$ may be a parent node to the node $B_1$ while row 1 of the source table 120 may indicate that the node $R_1$ may be also be a parent node to the node $B_1$. It should be appreciated that the first column (e.g., the PARENT_ID column) of the source table 120 may store a NULL value for any node that does not have a parent node. A node that lacks a parent node such as, for example, the node $R_1$, may be a root node of the graph 200.

In some example embodiments, the hierarchical data engine 110 may generate an index for traversing the graph 200 by at least iterating over the source table 120. For example, the hierarchical data engine 110 may generate the inner node map 300, which may enumerate mappings between the inner nodes of the graph 200 (e.g., the nodes $R_1$, $B_1$, $B_2$, $C_1$, and $C_3$) and the first row and a last row in the source table 120 occupied by each inner node of the graph 200. As noted, an inner node of the graph 200 may have at least one outgoing edge to a child node. Accordingly, the hierarchical data engine 110 may identify, based at least on the inner node map 300, the rows in the source table 120 occupied by the first child node and the last child node of each inner node in the graph 200.

In some example embodiments, the hierarchical data engine 110 may generate the index by further generating the root node list 310, which may enumerate the root nodes of the graph 200 including, for example, the node $R_1$. The hierarchical data engine 110 may add, for example, the node $R_1$ to the root node list 310 based at least on the node $R_1$ having a NULL value in the first column (e.g., the PARENT_ID column) of the source table 120.

The generation of the index may further include updating the next sibling vector 320 while the hierarchical data engine 110 iterates over the source table 120. The next sibling vector 320, which may enumerate the next sibling node of at least some of the nodes in the graph 200, may be updated whenever the hierarchical data engine 110 updates a mapping in inner node map 300. For example, the hierarchical data engine 110 may update the last row occupied by an inner node in the graph 200 each subsequent time the hierarchical data engine 110 encounters the same inner node in the first column (e.g., the PARENT_ID column) of the source table 200 during the iteration over the source table 200. An inner node that appears multiple times in the first column (e.g., the PARENT_ID column) of the source table 200 may be a parent node to multiple children nodes. Furthermore, the next sibling node of each child node may be a sibling node that occupies a higher row position in the source table 200. For example, when the mapping $R_1 \rightarrow \{1, 1\}$ in the inner node map 300 is updated to $R_1 \rightarrow \{1,2\}$ during the iteration over the first column (e.g., the PARENT_ID column) of the source table 120, the hierarchical data engine 110 may determine that the nodes $B_1$ and $B_2$ share the same parent node $R_1$ and that the node $B_2$ may be the next sibling node of the node $B_1$. Accordingly, upon updating the mapping $R_1 \rightarrow \{1,1\}$ to $R_1 \rightarrow \{1,2\}$, the hierarchical data engine 110 may further update the next sibling vector 320 to indicate that the node $B_2$ is the next sibling node to the node $B_1$.

Alternatively and/or additionally, the hierarchical data engine 110 may generate the index by generating the node identifier vector 330, which may enumerate a node identifier for each node in the graph 200. As noted, the hierarchical data engine 110 may assign a unique and non-default node identifier (e.g., non-NULL value) to each inner node of the graph 200, which may be enumerated in the inner node map 300. By contrast, the leaf nodes of the graph 200 may be associated with a default node identifier (e.g., a NULL value). Accordingly, a default node identifier (e.g., a NULL value) may signify that a node is a leaf node of the graph 200 whereas a non-default node identifier (e.g., a non-NULL value) may signify that the node is an inner node of the graph 200. For example, as shown in FIG. 3D, a default node identifier (e.g., the address 0x0000000) may be assigned to the leaf nodes of the graph 200 including, for example, the nodes $C_1$, $D_1$, and $D_2$. Meanwhile, each of the inner nodes of the graph 200 such as, for example, the nodes $R_1$, $B_1$, $B_2$, $C_1$, and $C_3$, may be assigned a unique and non-default identifier. For instance, FIG. 3D shows the node $C_1$ as being assigned the address 0x0800200, which may be a unique and non-default node identifier indicating that the node $C_1$ is an inner node of the graph 200 and not a leaf node of the graph 200.

At 404, the hierarchical data engine 110 may traverse, based at least on the index, the graph 200 corresponding to the source table 120. For example, the hierarchical data engine 110 may traverse the graph 200 based on the inner node map 300, the root node list 310, the next sibling vector 320, and/or the node identifier vector 330. As noted, the hierarchical data engine 110 perform a depth-first traversal of the graph 200 starting at the root node $R_1$ of the graph 200 and traversing every possible path in the graph 200 that starts and terminates at the rot node $R_1$. The hierarchical data engine 110 may traverse the sibling nodes in the graph 200 in the order the nodes appear in the source table 120. Furthermore, the hierarchical data engine 110 may detect cycles within the graph 120 during the traversal of the graph 120 in order to avoid entering an infinite loop.

In order to track the progress of the traversal of the graph 200, the hierarchical data engine 110 may traverse the graph 200 based on a stack, for example, by popping nodes onto and/or off the stack. For example, the hierarchical data engine 110 may pop, onto the stack, a node from the graph 200 when the hierarchical data engine 110 first encounters the node while traversing along a path through the graph 200. The nodes popped onto the stack may be a root node at a start of a path, a first child node of a previous node in the path, and/or a next sibling node of a previous node in the path.

In some example embodiments, the hierarchical data engine 110 may avoid popping, onto the stack, a node when the hierarchical data engine 110 detects a cycle in the graph 200, for example, the cycle formed by the nodes $B_1$, and $C_1$. The hierarchical data engine 110 may detect the cycle when the hierarchical data engine 110 encounters the same node a second time along the same path. For instance, the hierarchical data engine 110 may set a flag for every inner node that is visited by the hierarchical data engine 110 while traversing along a path through the graph 200.

The hierarchical data engine 110 may detect the presence of a cycle in the graph 200 (e.g., cycle formed by the nodes $B_1$, and $C_1$) when the hierarchical data engine 110 encounters a node whose visited flag indicates that the hierarchical data engine 110 has already encountered the node while traversing along the same path. When the hierarchical data engine 110 detects the presence of a cycle in the graph 200, the hierarchical data engine 110 may break the cycle by continuing the traversal of the graph 200 to a different child node instead of the child node that has already been visited by the hierarchical data engine 110. For example, the hierarchical data engine 110 may detect the cycle formed by the nodes $B_1$, and $C_1$ when the hierarchical data engine 110 traverses the node $B_1$ as a child node of the node $C_1$. The hierarchical data engine 110 may determine that the node $B_1$ completes a cycle in the graph 200 based on the visited flag associated with the node $B_1$, which may be set the first time the hierarchical data engine 110 traversed the node $B_1$ as a child node of the node $R_1$. Accordingly, the hierarchical data engine 110 may break the cycle by continuing the traversal of the graph 200 via the node $D_1$, which may be the other child node of the node $C_1$. For instance, the hierarchical data engine 110 may pop the node $D_1$ onto the stack instead of the node $B_1$ in order to avoid traversing through the node $B_1$ a second time.

In some example embodiments, the hierarchical data engine 110 may pop a node off the stack when the hierarchical data engine 110 encounters a leaf node of the graph 200 and/or determines that the hierarchical data engine 110 has traversed every child node descending from that node. The hierarchical data engine 110 may determine that a path is complete once the only node left in the stack is the node $R_1$, which may be the root node of the graph 200. If the hierarchical data engine 110 determines at this point that the hierarchical data engine 110 has traversed every child node descending from the node $R_1$, the hierarchical data engine 110 may pop the node $R_1$ off from the stack. Furthermore, when the root node of the graph 200 is popped off the stack and the stack is empty, the hierarchical data engine 110 may determine that the traversal of the graph 200 is complete.

Figure 5:
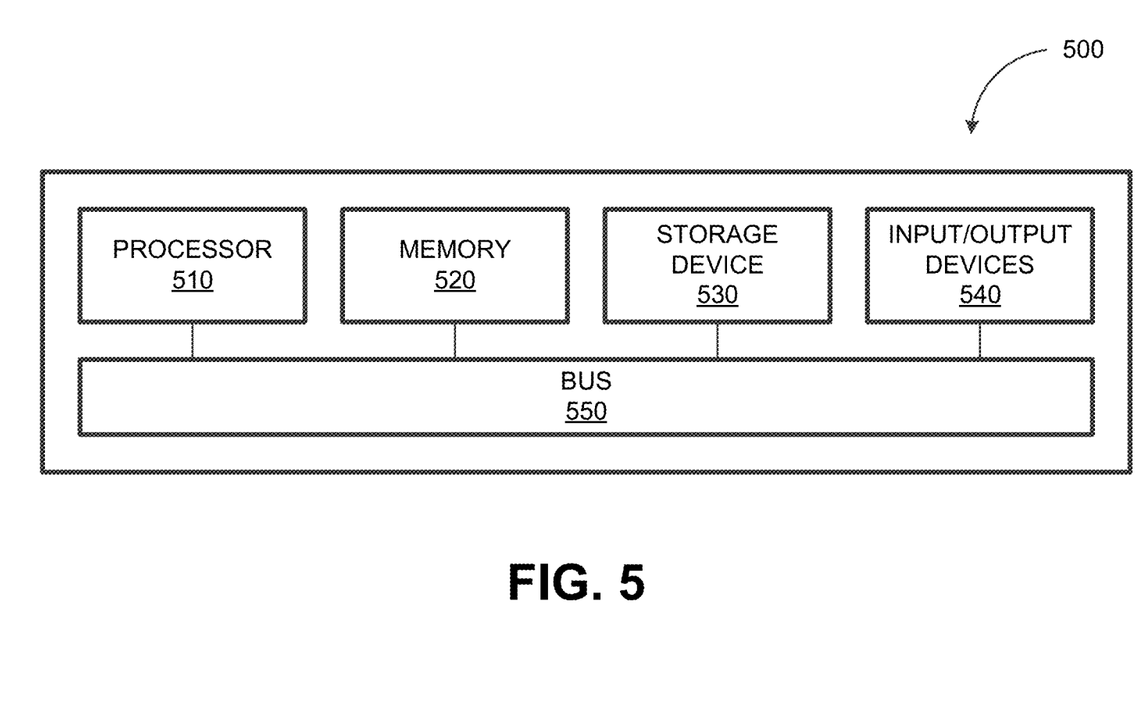
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the hierarchical data engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the hierarchical data engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      generating, based at least on a source table stored in a database, an index for traversing a graph corresponding to the source table, the source table including a first column storing one or more identifiers of parent nodes in the graph, the source table further including a second column storing one or more identifiers of the corresponding children nodes in the graph, the generating of the index including iterating over the first column of the source table to generate a next sibling vector and an inner node map, the next sibling vector identifying, for at least one node in the graph, a next sibling node descending from a same parent node but occupying a subsequent row in the source table, the inner node map identifying one or more nodes in the graph having at least one outgoing edge, the index being generated by at least adding, to the inner node map, a first mapping associating a first parent node to a first row in the source table occupied by the first parent node and a first child node of the first parent node, updating the first mapping upon encountering a second row in the source table occupied by the first parent node and a second child node of the first parent node, the first mapping being updated to associate the first parent node to the first row and the second row in the source table, and in response to updating the first mapping included in the inner node map, updating the next sibling vector to identify the second child node of the first parent node as a next sibling node of the first child node of the first parent node; and traversing, based at least on the index, the graph, the index enabling the graph to be traversed depth first starting from a root node of the graph and continuing to a first child node descending from the root node of the graph.

2. The system of claim 1, wherein the index is further generated by at least:

updating the first mapping in response to encountering a third row in the source table occupied by the first parent node and a third child node of the first parent node, the first mapping being updated to associate the first parent node to the first row and the third row in the source table; and in response to updating the first mapping included in the inner node map, updating the next sibling vector to identify the third child node as a next sibling node of the second child node.

3. The system of claim 1, wherein the index is further generated by at least:

updating a second mapping included in the inner node map, the second mapping being updated to associate a second parent node to a third row in the source table occupied by the second parent node and a first child node of the second parent node, and the second mapping further being updated to associated the second parent node to a fourth row in the source table occupied by the second parent node and a second child node of the second parent node.

4. The system of claim 3, further comprising:

in response to updating the second mapping, updating the next sibling vector to at least identify the second child node of the second parent node as a next sibling node of the first child node of the second parent node.

5. The system of claim 1, wherein the generating of the index further includes iterating over at least the portion of the source table to generate a root node list, wherein a node is added to the root node list based at least on the node not being associated with a parent node in the source table, and wherein the root node list enables an identification of the root node from which to start traversing the graph.

6. The system of claim 1, further comprising:

assigning, to the inner node, a unique node identifier.

7. The system of claim 6, wherein the generating of the index further includes generating a node identifier vector, and wherein the node identifier vector is updated to include the unique node identifier assigned to the inner node.

8. The system of claim 7, wherein the node identifier vector further includes a default node identifier associated with a leaf node in the graph, wherein the leaf node comprises a node without any outgoing edges, and wherein the unique node identifier and/or the default node identifier enable a differentiation between the inner node of the graph and the leaf node of the graph.

9. The system of claim 1, wherein the traversing of the graph comprises:

popping, onto a stack, the root node followed by a first child node of a root node of the graph;

setting a first flag associated with the root node, the first flag being set to indicate the root node as having being traversed along a current path through the graph, the current path starting and terminating at the root node;

setting a second flag associated with the first child node, the second flag being set based at least on the first child node being an inner node and not a leaf node, and the second flag being set to indicate the first child node as having being traversed along the current path;

determining, based at least on a third flag associated with a child node of the first child node, whether the first child node and its child node form a cycle; and in response to determining that the first child node and its child node form the cycle, breaking the cycle by at least avoiding traversing through the child node of the first child node.

10. The system of claim 9, wherein traversing through the child node of the first child node is avoided by at least popping, onto the stack, a next sibling node of the first child node instead of the its child node.

11. The system of claim 9, further comprising:

determining, based at least on the index, the root node, the first child node, the child node of the first child node, and/or the next sibling node of the first child node.

12. The system of claim 9, further comprising:

resetting the first flag, the second flag, and/or the third flag in response to the root node being an only node remaining in the stack.

13. The system of claim 9, wherein the first flag, the second flag, and/or the third flag are stored as a part of at least one mapping included in the inner node map.

14. The system of claim 1, wherein the graph includes a plurality of nodes, wherein the graph further includes one or more edges interconnecting the plurality of nodes, and wherein a directionality of each of the one or more edges indicates one or more parent-child relationships amongst the plurality of nodes.

15. A computer-implemented method, comprising:

generating, based at least on a source table stored in a database, an index for traversing a graph corresponding to the source table, the source table including a first column storing one or more identifiers of parent nodes in the graph, the source table further including a second column storing one or more identifiers of the corresponding children nodes in the graph, the generating of the index including iterating over the first column of the source table to generate a next sibling vector and an inner node map, the next sibling vector identifying, for at least one node in the graph, a next sibling node descending from a same parent node but occupying a subsequent row in the source table, the inner node map identifying one or more nodes in the graph having at least one outgoing edge, the index being generated by at least adding, to the inner node map, a first mapping associating a first parent node to a first row in the source table occupied by the first parent node and a first child node of the first parent node, updating the first mapping upon encountering a second row in the source table occupied by the first parent node and a second child node of the first parent node, the first mapping being updated to associate the first parent node to the first row and the second row in the source table, and in response to updating the first mapping included in the inner node map, updating the next sibling vector to identify the second child node of the first parent node as a next sibling node of the first child node of the first parent node; and traversing, based at least on the index, the graph, the index enabling the graph to be traversed depth first starting from a root node of the graph and continuing to a first child node descending from the root node of the graph.

16. The method of claim 15, wherein the index is further generated by at least:

updating the first mapping in response to encountering a third row in the source table occupied by the first parent node and a third child node of the first parent node, the first mapping being updated to associate the first parent node to the first row and the third row in the source table; and in response to updating the first mapping included in the inner node map, updating the next sibling vector to identify the third child node as a next sibling node of the second child node.

17. The method of claim 16, wherein the index is further generated by at least:

updating a second mapping included in the inner node map, the second mapping being updated to associate a second parent node to a third row in the source table occupied by the second parent node and a first child node of the second parent node, and the second mapping further being updated to associated the second parent node to a fourth row in the source table occupied by the second parent node and a second child node of the second parent node to generate a next sibling vector, wherein the next sibling vector indicates a next sibling node; and in response to updating the second mapping, updating the next sibling vector to at least identify the second child node of the second parent node as a next sibling node of the first child node of the second parent node.

18. The method of claim 15, wherein the generating of the index further includes iterating over at least the portion of the source table to generate a root node list, wherein a node is added to the root node list based at least on the node not being associated with a parent node in the source table, and wherein the root node list enables an identification of the root node from which to start traversing the graph.

19. A non-transitory computer readable medium storing instructions, which when executed by at least one data processor, result in operations comprising:

generating, based at least on a source table stored in a database, an index for traversing a graph corresponding to the source table, the source table including a first column storing one or more identifiers of parent nodes in the graph, the source table further including a second column storing one or more identifiers of the corresponding children nodes in the graph, the generating of the index including iterating over the first column of the source table to generate a next sibling vector and an inner node map, the next sibling vector identifying, for at least one node in the graph, a next sibling node descending from a same parent node but occupying a subsequent row in the source table, the inner node map identifying one or more nodes in the graph having at least one outgoing edge, the index being generated by at least adding, to the inner node map, a first mapping associating a first parent node to a first row in the source table occupied by the first parent node and a first child node of the first parent node, updating the first mapping upon encountering a second row in the source table occupied by the first parent node and a second child node of the first parent node, the first mapping being updated to associate the first parent node to the first row and the second row in the source table, and in response to updating the first mapping included in the inner node map, updating the next sibling vector to identify the second child node of the first parent node as a next sibling node of the first child node of the first parent node; and traversing, based at least on the index, the graph, the index enabling the graph to be traversed depth first starting from a root node of the graph and continuing to a first child node descending from the root node of the graph.

* * * * *